(12) United States Patent
Mathews et al.

(10) Patent No.: US 12,314,296 B1
(45) Date of Patent: May 27, 2025

(54) SYSTEMS AND METHODS FOR FACILITATING FORMATION OF UNIVERSITY-COMMUNITY PARTNERSHIPS

(71) Applicants: Mason Mathews, Tempe, AZ (US); Brajesh Karna, Tempe, AZ (US); Patricia Solis, Tempe, AZ (US)

(72) Inventors: Mason Mathews, Tempe, AZ (US); Brajesh Karna, Tempe, AZ (US); Patricia Solis, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 18/241,953

(22) Filed: Sep. 4, 2023

Related U.S. Application Data

(63) Continuation of application No. 18/097,658, filed on Jan. 17, 2023, now abandoned, which is a continuation of application No. 18/045,005, filed on Oct. 7, 2022, now abandoned.

(60) Provisional application No. 63/253,382, filed on Oct. 7, 2021.

(51) Int. Cl.
   *G06F 16/338* (2019.01)
   *G06F 16/31* (2019.01)
   *G06F 16/3332* (2025.01)

(52) U.S. Cl.
   CPC ........ *G06F 16/3334* (2019.01); *G06F 16/313* (2019.01); *G06F 16/338* (2019.01)

(58) Field of Classification Search
   CPC ... G06F 16/313; G06F 16/338; G06F 16/3334
   See application file for complete search history.

(56) References Cited

U.S. PATENT DOCUMENTS

| | | | |
|---|---|---|---|
| 2013/0185328 A1* | 7/2013 | Yoo | G06F 16/319 707/769 |
| 2015/0186364 A1* | 7/2015 | Nelson | G06F 16/245 707/722 |
| 2018/0350455 A1* | 12/2018 | Rosen | G16H 80/00 |
| 2019/0287671 A1* | 9/2019 | Mako | A61B 90/98 |
| 2021/0056113 A1* | 2/2021 | Mac an tSaoir | G06F 16/24578 |
| 2021/0098092 A1* | 4/2021 | Katuwal | G06F 16/152 |
| 2022/0165430 A1* | 5/2022 | Limsopatham | G06N 5/025 |

(Continued)

OTHER PUBLICATIONS

Arda, S.E., et al., "DS3: A System-Level Domain-Specific System-on-Chip Simulation Framework," IEEE Transactions on Computers, vol. 69, No. 8, Aug. 2020, 15 pages.

(Continued)

*Primary Examiner* — Tarek Chbouki
(74) *Attorney, Agent, or Firm* — Polsinelli PC

(57) ABSTRACT

A system and associated methods apply text and network analysis methods to process information from online university researcher profiles and community organization websites to identify topics and shared interests that the groups have in common. The system includes a search platform that enables users to enter their name, their organization name, or a research topic and identify entities with similar work topics of interest. The system packages entity information and shared topic information into edge lists for ease of recall, and facilitates communication between entities.

20 Claims, 13 Drawing Sheets

(56) References Cited

U.S. PATENT DOCUMENTS

2023/0197218 A1* 6/2023 Gnanasambandam ..................... G16H 10/60 705/3
2023/0402157 A1* 12/2023 Hendriks ............... G16H 30/40

OTHER PUBLICATIONS

Bittencourt, L.F., Sakellariou, R., Madeira, Edmundo R.M., "DAG Scheduling Using a Lookahead Variant of the Heterogeneous Earliest Finish Time Algorithm," IEEE Computer Society, 2010, 8 pages.

Chronaki, K., et al., "Task Scheduling Techniques for Asymmetric Multi-Core Systems," IEEE Transactions on Parallel and Distributed Systems, vol. 28, No. 7, Jul. 2017, 14 pages.

Hennessy, John L., and Patterson, David A., "A New golden Age for Computer Architecture," Communications of the ACM, vol. 62, No. 2, Feb. 2019, 13 pages.

Krishnakumar, A., et al., "Runtime Task Scheduling Using Imitation Learning for Heterogeneous Many-Core Systems," IEEE Transactions on Computer-Aided Design of Integrated Circuits and Systems, vol. 39, No. 11, Nov. 2020, 14 pages.

Mack, J., et al., "User-Space Emulation Framework for Domain-Specific SoC Design," IEEE International Parallel and Distributed Processing Symposium Workshops (IPDPSW), 2020, 10 pages.

Namazi, Alireza, Safari, Saeed, and Mohammadi, Siamak,"CMV: Clustered Majority Voting Reliability-Aware Task Scheduling for Multicore Real-Time Systems," IEEE Transactons on Reliability, vol. 68, No. 1, Mar. 2019, 14 pages.

Pabla, Chandandeep Singh, "Completely Fair Scheduler," Linux Journal, Aug. 1, 2009, 11 pages.

Streit, Achim, "A Self-Tuning Job Scheduler Family with Dynamic Policy Switching," JSSPP 2002, LNCS 2537, 23 pages.

Topcuoglu, H., Hariri, S., Wu, Min-You, "Performance-Effective and Low-Complexity Task Scheduling for Heterogeneous Computing," IEEE Transactions on Parallel and Distributed Systems, vol. 13, No. 3, Mar. 2002, 15 pages.

Zhou, Junyan, "Real-time task scheduling and network device security for complex embedded systems based on deep learning networks," Microprocessors and Microsystems 79, Sep. 21, 2020, 10 pages.

* cited by examiner

Document Matching

Upload a File browse    no file selected...    upload

| File Name (2) | Upload Date |
|---|---|
| event_A_keywords | xx/xx/xxxx  *download* |
| Project_B_proposal | xx/xx/xxxx  *download* |

| 610 | receive a document including text indicative of the set of topic parameters including the one or more macro-level topic parameters or the one or more micro-level topic parameters |

| 620 | apply a natural language processing methodology to the document yielding the information indicative of the set of topic parameters including the one or more macro-level topic parameters or the one or more micro-level topic parameters present within the document |

| 710 | receive information including a user-defined tag |

| 720 | associate one or more entities of the plurality of entities represented within the database with the user-defined tag |

| 730 | store a list including information indicative of each entity associated with the user-defined tag at the database |

FIG. 5D

SYSTEMS AND METHODS FOR FACILITATING FORMATION OF UNIVERSITY-COMMUNITY PARTNERSHIPS

CROSS-REFERENCE TO RELATED APPLICATIONS

This is a continuation patent application of U.S. Non-Provisional application Ser. No. 18/097,658 filed on Jan. 17, 2023 that is a continuation application of U.S. Non-Provisional patent application Ser. No. 18/045,005 filed on Oct. 7, 2022 that claims benefit to U.S. Provisional Patent Application Ser. No. 63/253,382 filed 7 Oct. 2021, which are herein incorporated by reference in their entirety.

FIELD

The present disclosure generally relates to research collaboration systems, and in particular, to a system and associated method for a research collaboration system that facilitates connections between entities based on shared topics.

BACKGROUND

Arizona State University's Charter includes Eight Design Aspirations with several components that require robust university-community partnerships to achieve. These include: Leveraging Our Place, Transforming Society, Conducting Use-Inspired Research, and Being Socially Embedded in the community. The best examples of university-community partnerships are mutually beneficial. In these partnerships, community organizations gain access to cutting edge university research that can improve the strategies they use or provide them with new data, tools, and technologies that enhance their work. University researchers need partnerships with community organizations in order to conduct the type of empirical research that is so important to scientific discovery. These partnerships not only provide access to essential data, but they help researchers identify research questions and topics. University-community partnerships can also provide access to the people affected by the problems university researchers are trying to understand and solve. Ideal university-community partnerships fuse the unique knowledge, skills, and abilities of university researchers and community organizations to achieve outcomes that would otherwise be unattainable.

Although they can be highly beneficial to both parties, university-community partnerships can be difficult to create. One difficulty is identifying potential partners with similar interests. Although many community organizations and university researchers have websites and online profiles that describe their interests, these can take enormous amounts of time, energy, and even resources to locate, read, and process. Presently, partnership connections rely heavily on manual searches and the latent knowledge of key individuals, where reliance on personal networks inherently limits the extent to which relationships are brokered, and may exacerbate bias or power relations. Potential opportunities for novel configurations of collaboration go unrecognized. There is a need for tools that can streamline this process and reduce the burdens of time, energy, and effort that are currently required to identify potential partners for university-community collaborations. Presently, these decisions about where researchers should reach out to external collaborators are made ad hoc, serendipitously, or with very laborious manual searches which may or may not be tailored for the purpose of university-community collaborations. Moreover, too frequently, the decision about "outreach" to community stakeholders happens after the research has been developed or designed.

It is with these observations in mind, among others, that various aspects of the present disclosure were conceived and developed.

BRIEF DESCRIPTION OF THE DRAWINGS

FIGS. 4A-4E are a series of illustrations showing a user interface of the system of FIG. 1;

FIGS. 5A-5D are a series of process flows showing various processes for facilitating collaboration between research entities by the system of FIG. 1.

Corresponding reference characters indicate corresponding elements among the view of the drawings. The headings used in the figures do not limit the scope of the claims.

DETAILED DESCRIPTION

University researchers and people in non-university organizations often have similar interests, goals, and objectives. These goals include improving a number of outcomes associated with the health, wellness, and stability of the communities where they live and work. However, both groups are often unaware of their shared interests and how these interests can lead to productive collaboration. The process of searching through hundreds of organization websites and researcher profiles to identify potential partners can take a great deal of time, energy, and effort.

Community organizations and researchers will benefit from a system that reads all the websites and work bios for them, identifies the topics of interest they have in common, packages the information such that it is easily interpreted and references, and facilitates communication between entities. The present disclosure provides a system for facilitating collaboration between research entities based on shared topics of focus. The system applies data organization methods as well as natural language processing and semantic network analysis to show users exactly which entities (e.g., researchers and organizations) share similar interests.

A computer-implemented system 100 (hereinafter, "system 100") enables users to search for potential partnerships between university personnel and community organizations based on a systematic approach that combines text and network analysis methods. While there are examples of faculty-to-faculty collaboration tools, there is a need for collaborative tools that include external organizations such as nonprofit organizations, companies, research institutions and other universities based on shared interests and topics of focus.

Figure 1:
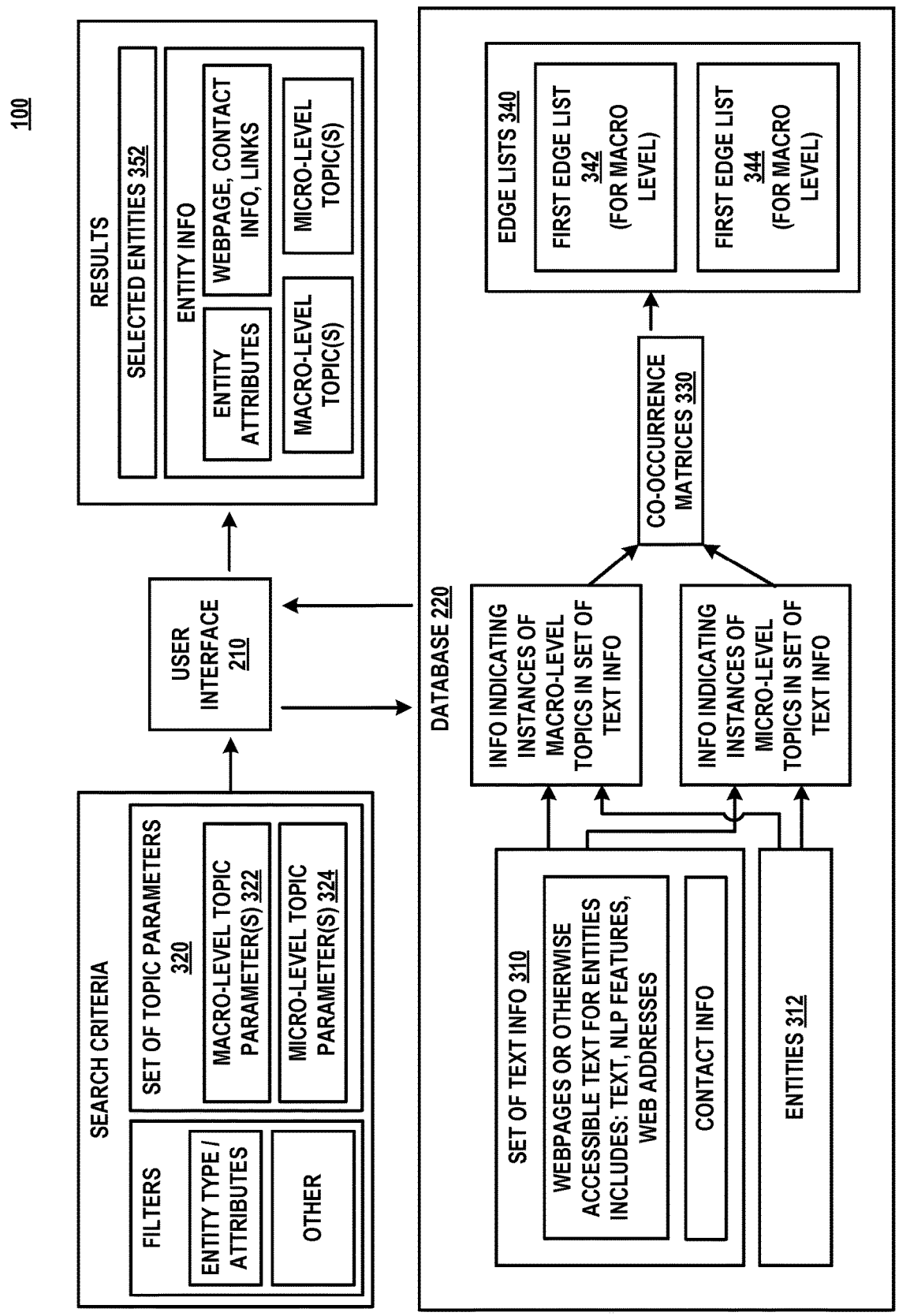
FIG. 1 is a block diagram showing a computer-implemented system for facilitating collaboration between research entities.

In one aspect, the system 100 can be computer-implemented, e.g., by a computing device 102 (shown in FIG. 6), and can be accessible across one or more computing devices 102 through a web-based application or another implementation. Notably, with reference to FIG. 1, the system 100 maintains a database 220 featuring one or more co-occurrence matrices 330 that denote connections between one or more entities 312 (e.g., individuals including researchers, faculty, and leaders, as well as organizations including non-profit organizations, research institutions, and universities, which can include both in-organization entities and external entities) that are represented within the database 220. The one or more co-occurrence matrices 330 identify macro-level topics and micro-level topics that are present within a set of textual information 310 including information extracted from online profiles of individual researchers and university personnel, as well as text from publicly available websites of organizations, universities, and research institutes. The system 100 converts the one or more co-occurrence matrices 330 into one or more edge lists 340, which are computationally less expensive and enable the system 100 to better process shared interest searches within the database 220. In some embodiments, the system 100 leverages natural language processing techniques including topic modeling approaches to identify "macro-level" categories of shared interests (e.g., as "macro-level" topics) across the plurality of entities 312 represented within the database 220. The system 100 is also operable to identify "micro-level" shared interests (e.g., as "micro-level" topics, represented within the text as n-grams) between the plurality of entities 312 represented in the database 220 based on the set of textual information 310 obtained from the organization websites and university researcher data (e.g., profiles, publication title and abstracts from publications, proposals, and patents).

In addition to the underlying architecture, the system 100 provides a user interface 210 that provides multiple ways to search for shared interests between researchers and organizations. The system 100 has several features that are not present in other tools. For example, the system 100 can include a Project Proposal Matching Feature in which the system 100 receives a document that can include a project proposal or research description document, processes the text in the document, and searches for potential matches among the plurality of entities (e.g., university or research institute personnel as well as organizations) represented within the database 220 that have similar text in their profiles and websites. In another aspect, the system 100 can generate one or more Collaboration Rosters, in which the system 100 enables users to save searches of potential collaboration partners (such as university or research institution personnel and organizations) under one or more user-defined tags, which they can use to create rosters for meetings, proposal development teams, and other collaboration activities. In a third aspect, the system 100 can include a Multi-word Search Feature that enables users to identify researchers and organizations that fit multiple search terms. This feature also provides a network diagram that shows relationships between researchers/organizations by keyword. This information can enable users to see the connections between potential partners and areas of expertise.

The system 100 combines data gathering, data management, and user interface features that facilitate collaboration between universities and nonprofit organizations in ways that are not currently possible with existing tools.

There are many tools that use similar techniques in research network platforms in which people sign up to participate, and there are similar tools within universities that enable university personnel to identify one another. However, at present, there appear to be no other tools that use the aforementioned text processing and data management features to identify potential partnerships between university personnel and non-university organizations based on shared macro-level or micro-level topics or interest or that facilitate communication between identified entities.

Methods of Operation

In one aspect, the system 100 employs natural language processing and semantic network analysis methods to identify shared interests between entities (e.g., organizations and individuals) working in a community based on how they describe their work in their websites and online university profiles and abstracts (e.g., through publications, proposals, patents, etc.).

In particular, the system 100 is operable to identify shared interests among entities (e.g., university researchers and non-university organizations) at two different levels. First, the system 100 uses topic modeling methodologies to identify overarching "macro-level" work topics associated with each respective entity 312 of the plurality of entities 312 represented within the database 220 based on the set of textual information 310, which includes text descriptive of work associated with each respective entity 312 in their websites and web profiles. By identifying these overarching "macro-level" topics within the set of textual information 310, the system 100 can identify one or more selected entities 352 of the plurality of entities 312 who work on "macro-level" topics of interest such as health, addiction, food security, and other topics. The user interface 210 of the system 100 can include search options that enable users to select or otherwise provide one or more macro-level topic parameters 322 to the system 100 and can display information such as a listing of one or more selected entities 352 represented within the database 220 that express interest in these macro-level topics on their webpages and research profiles.

The system 100 is also operable to "scan" the set of textual information 310 extracted from the websites, bios, resumes, publicly available publication titles, and abstracts to identify groupings of words (n-grams) that are relevant to more micro-level topics and issues of interest such as "water conservation," "public health," or "food desert." Many n-grams represent more specific work and research topics that interest both community organizations and university researchers and are not captured in the macro-level topic modeling analysis. As such, the user interface 210 of the system 100 can include search options that enable users to select or otherwise provide one or more micro-level topic parameters 324 including the one or more n-grams to the system 100 and can display information such as a listing of one or more selected entities 352 represented within the database 220 that express interest in these micro-level topics on their webpages and research profiles.

Finally, the system 100 generates a network mapping (e.g., one or more co-occurrence matrices 330 and one or more edge lists 340) of instances in which two or more entities 312 of the plurality of entities 312 are linked if the set of textual information 310 from within their webpages and work profiles include the same macro-level topics and micro-level topics. These network mappings can include one or more co-occurrence matrices 330 at the topic level, that show connections between the plurality of entities 312 represented within the database 220 by topic. For example, if the content from a non-profit organization's website (e.g., pertaining to a first entity) and a researcher's profile (e.g., pertaining to a second entity) indicate that both are interested in the macro-level topic "health", then the system 100 represents the shared connection between the first entity and the second entity in a first co-occurrence matrix associated with the macro-level topic "health". If the micro-level topic "breast cancer" occurs within the set of textual information associated with the first entity and also occurs within the set of textual information associated with the second entity, then the system 100 represents a linkage between the two entities in a second co-occurrence matrix associated with the micro-level topic "breast cancer". The more macro-level topics and micro-level topics the non-profit organization's website and the researcher's profile have in common, the stronger the tie (and collaboration potential) between the two entities.

The system 100 can generate the one or more co-occurrence matrices 330 in which each respective entity identified within the database 220 is represented by a respective row of the co-occurrence matrix and each respective keyword (e.g., each respective macro-level topic parameter and/or micro-level topic parameter) is represented by a respective column of the co-occurrence matrix 330. As such, each respective co-occurrence matrix 330 can include a plurality of cells, where each respective cell is associated with a row and a column. Each respective cell is indicative of a quantity of instances of an associated macro-level topic or an associated micro-level topic identifiable within the set of textual information 310 for an associated entity.

To improve search capacity, the system 100 can convert the one or more co-occurrence matrices 330 into one or more edge lists 340 indicative of one or more macro-level topics or one or more micro-level topics that are common to one or more entities 312 represented within the database 220 based on the set of textual information 310. In particular, the system 100 can generate at least one of a first edge list 342 or a second edge list 344 of the one or more edge lists 340, the first edge list 342 being indicative of one or more macro-level topics that are common to one or more entities 312 represented within the database 220 and the second edge list 344 being indicative of one or more micro-level topics that are common to one or more entities 312 represented within the database 220. The system 100 can store the one or more edge lists 340 within the database 220, and can use the one or more edge lists 340 when querying the database 220 for entities that share one or more macro-level topics or micro-level topics.

In another aspect, the system 100 can also record user search queries, which can be used as part of a recommender system to improve searches. In particular, the system 100 can capture user search terms and provide the user search terms to the recommender system, which can suggest related search terms to users based on the user search terms collected by the system 100 over time. In another aspect, the system 100 can use the captured user search terms and determining the most searched for macro-level topics and micro-level topics. This information can also be used to improve and maintain aspects of the system 100, such as regularly updating co-occurrence matrices 330 and edge lists 340 associated with the most searched for macro-level topics and micro-level topics. In this manner, the system 100 can provide quick results for popular topics. The system 100 can further be expanded by inclusion of a topic recommender mechanism that can recommend related macro-level topics and micro-level topics to further aid users in developing collaborations between entities.

In one aspect, the system 100 provides a user interface 210 that enables users to search for potential partners based on similarities in shared work topic interests. The user interface 210 is shown in detail in FIGS. 4A-4E. A person working at an organization can provide, at the user interface 210, the name of their organization to the system 100. The system 100 can identify and display, based on the one or more edge lists 340 maintained within the database 220, names of individual entities such as researchers within the same organization or from other organizations that have similar work interests. The system 100 also indicates which macro-level topics and micro-level interests the organization and the individual entities have in common. The system 100 can provide links (e.g., web addresses) to the researchers' profiles across one or more websites (such as profiles on organization websites or other profiles such as LinkedIn or Google Scholar) and/or other information such as department and/or job title, and contact information.

Individuals (e.g., university faculty and researchers) can use the system 100 in a similar fashion to identify organizations that have shared interests. They can input their name into the user interface 210 of the system 100 and the system 100 can provide the names of organizations within their region (e.g., by city, county, state, multi-state region or country) that have similar shared interests in form of macro-level topics and micro-level topics that are common between the individual and the organizations based on the one or more edge lists 340 maintained within the database 220. The user interface 210 also shows which micro-level topics (e.g., as n-grams) that the researcher and organization have in common based on the one or more edge lists 340 maintained within the database 220 and provides links to the organizations' websites so researchers can easily seek more information regarding organizations with similar interests.

Organization employees and researchers can also search for potential partners by topic areas using the system 100. In particular, users can type a macro-level topic parameter 322 such as "health". The system 100 can query the database 220 with the macro-level topic parameter 322, and can generate a list of selected entities 352 including university faculty and organizations that work in this "macro-level" topic area based on the one or more edge lists 340 maintained within the database 220. Users can also search for "micro-level" topics of shared interests by entering a micro-level topic parameter 324 in the form of a more specific n-gram (such as "mental health") into the user interface 210. The system 100 can then query the database 220 for the micro-level topic parameter 324. The system 100 can indicate whether there are any examples of this n-gram within the database 220. If so, the system 100 generates a list of selected entities 352 including individual researchers within the region that have this n-gram present in their websites and/or research bios based on the one or more edge lists 340 maintained within the database 220.

Although the first priority of the system 100 is to identify opportunities for collaboration between external community organizations and in-organization researchers, the system 100 can also be used to identify opportunities for collaboration between whole organizations (e.g., between a first organization and a second organization) or between individual researchers (e.g., between a first individual and a second individual). For example, the system 100 can provide an option for a user to choose what type of entity to search for within the user interface 210; for example, a user can indicate to the system 100 through the user interface 210 to focus the search on entities that are organizations or to focus the search on individual researchers.

Figure 4A:
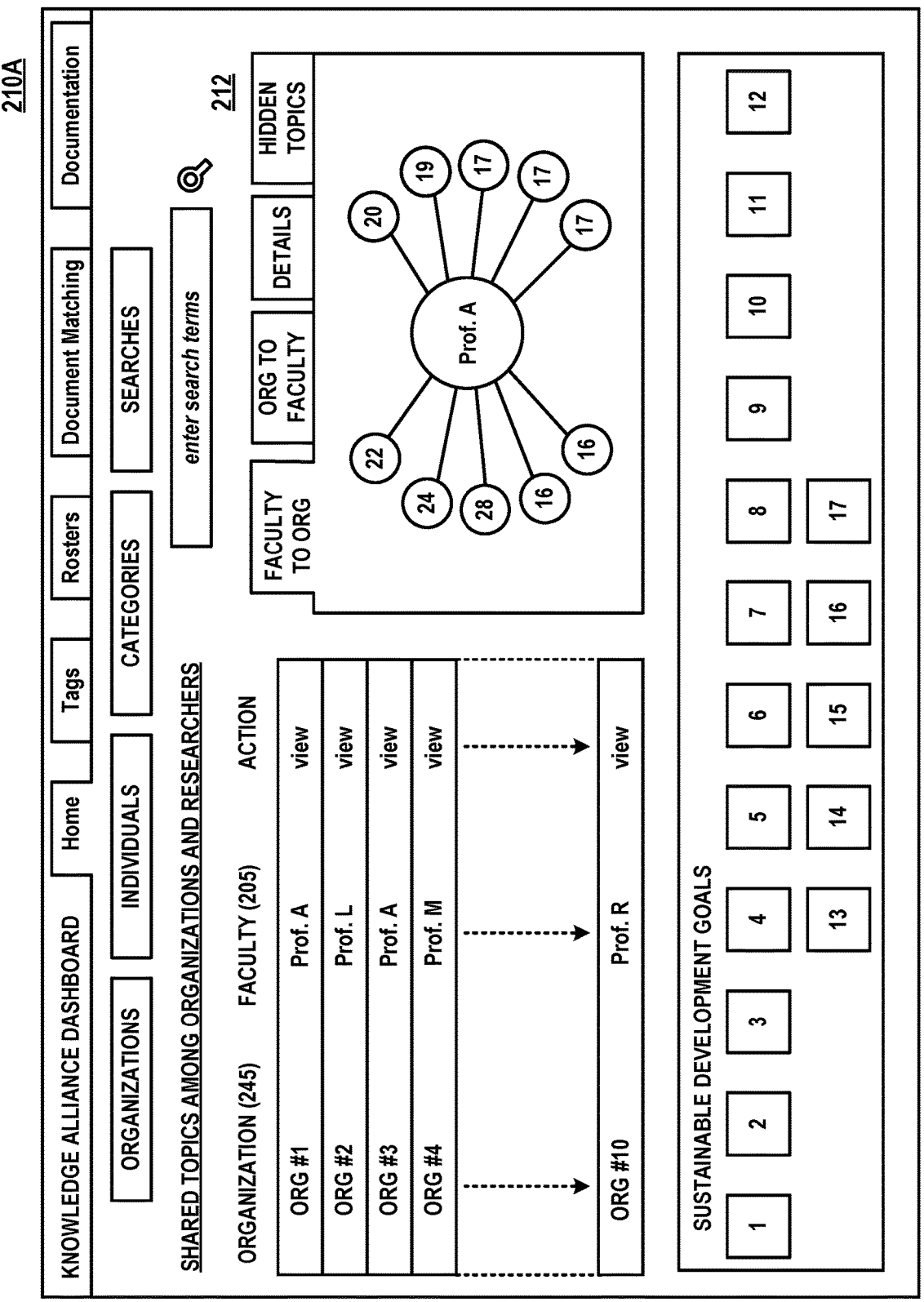
Figure 4B:
Figure 4C:
Figure 4C:
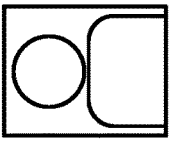
Figure 4D:
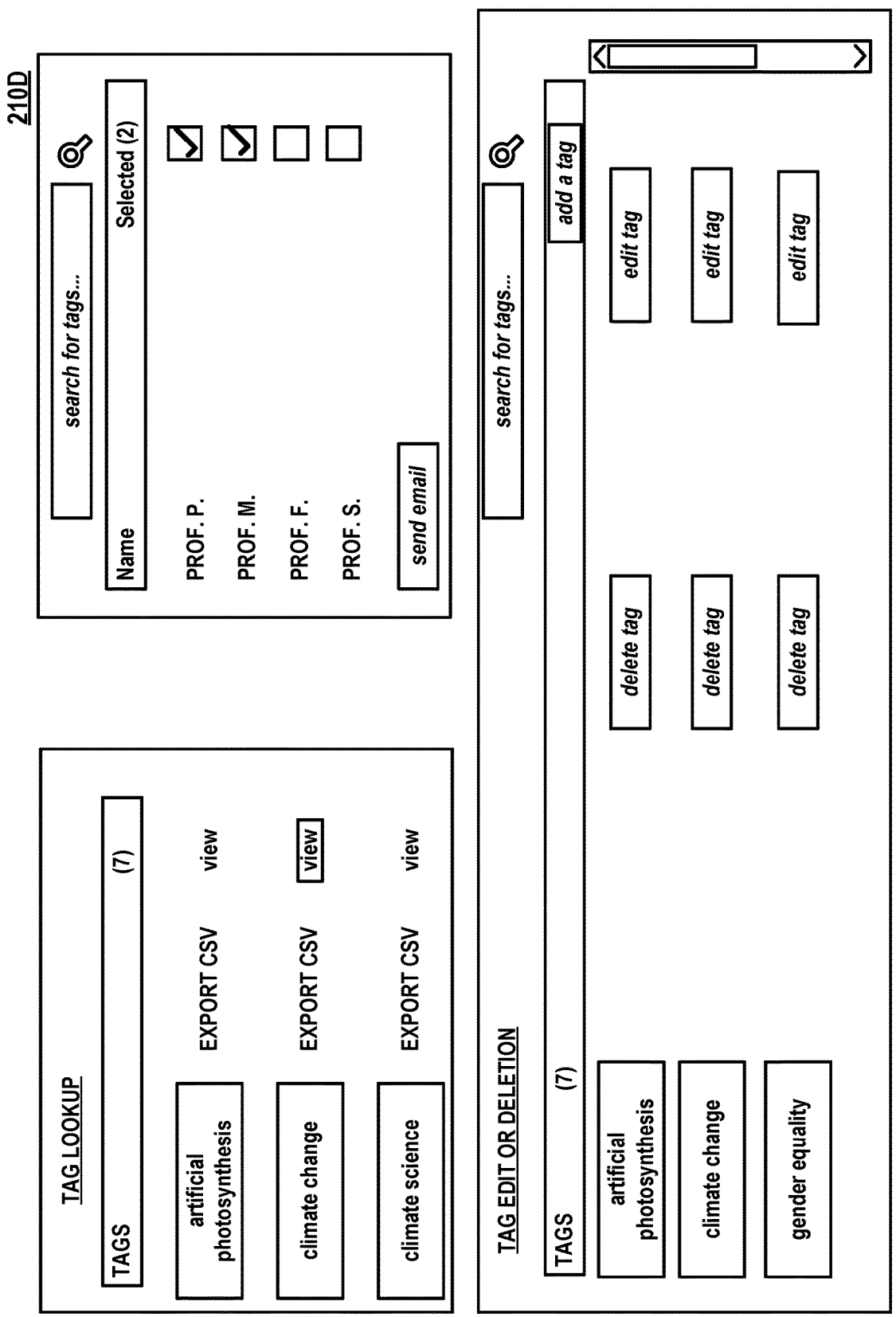

Although the macro-level topic modeling and micro-level topic matching features are key parts of the system 100, the system 100 can include other features that will also help users to identify potential partners with shared interests. These features can also improve the capacity of users to conduct, manage, save, and export searches. In so doing, the system 100 saves time and effort that can better be spent elsewhere. FIGS. 4A-4E show various images of one implementation of the user interface 210 of the system 100; in particular, FIG. 4A shows a first interface 210A of the user interface 210 (e.g., a "home" page), FIG. 4B shows a second interface 210B of the user interface 210 (e.g., a "keyword lookup" page), FIG. 4C shows a third interface 210C of the user interface 210 (e.g., a "search entities" page that shows individual entity profiles), FIG. 4D shows a fourth interface 210D of the user interface 210 (e.g., a "tags" page), and FIG. 4E shows a fifth interface 210E of the user interface 210 (e.g., a "document matching" page).

1. Search by Org/Faculty Name or n-Gram

Users can enter search terms (e.g, the set of topic parameters 320, and can also include specific names of entities) at the first interface 210A shown in FIG. 4A, at the second interface 210B shown in FIG. 4B, or at the third interface 210C shown in FIG. 4C to view information associated with each. This feature provides information regarding the keywords (e.g., macro-level topic parameters or micro-level topic parameters) associated with different entities including university researchers and organizations. If a user knows the name of an entity such as a university faculty member or organization and would like information regarding their work/research interests, the user can search for them directly using the system 100 by providing the name of the entity at the user interface 210. The system 100 can query the database 220 with the name of the entity and can retrieve and display contact information and other information for the entity (e.g., such as links to their website or profile).

Further, the system 100 can retrieve and display a listing of macro-level topics and/or micro-level topics associated with the entity based on the one or more edge lists 340 maintained within the database 220 and can highlight one or more macro-level topics or micro-level topics that the entity and the user have in common. Alternatively, if a user has a specific macro-level topic parameter 322 or micro-level topic parameter 324 they want to search for, the user can enter the macro-level topic parameter 322 or micro-level topic parameter 324 at the user interface 210. The system 100 can query the database 220 with the macro-level topic parameter 322 or micro-level topic parameter 324 to identify or more selected entities 352 represented within the database 220 that are associated with the macro-level topic parameter 322 or micro-level topic parameter 324 based on the one or more edge lists 340. If the micro-level topic parameter 324 is a specific n-gram, the system 100 can identify one or more selected entities 352 including university researchers and organizations with profiles that mention the n-gram, and the number of times the n-gram appears in each respective profile and webpage as output through the user interface 210. As shown in FIG. 4C, the system 100 can also retrieve and provide clickable links to the publicly available textual information that is available on the internet for entities such as university researchers and organizations, including links to profiles within organization directories, department links, and Google scholar links. For organization searches, the system 100 can provide links (e.g., web addresses) to publicly available websites for each organization result and shows organization contact information such as addresses, phone numbers, and can include names and contact info for employees or volunteers of the organization who serve as main points of contact.

2. Search for Available Keywords

As shown in the second interface 210B shown in FIG. 4B, users of the system 100 may want to know if there are additional potential search terms related to a keyword. For example, a user may want to know if there are any additional keywords related to "climate" that are available within the database 220 maintained by the system 100. As such, the system 100 can receive input from the user indicative of a keyword and the system 100 can provide one or more available n-grams of words represented within the database 220 that include the keyword. For example, if a user enters the word "climate" at the user interface 210 and indicates that the user wants to see one or more related n-grams within the database 220, the system 100 can display a list of possible n-grams represented within the database 220 that include climate (such as "climate change", "climate vulnerability," etc.) that appear in the textual information available to the system 100 (e.g., that appear in researcher and organization profiles and webpages). This feature is intended to help users improve their searches by providing them with available search term options. Since researchers and organizations often use different terminology to discuss similar topics, this feature of the system 100 provides users with different search terms that can be used to improve their searches.

3. Organization to Organization and In-Organization Researcher to Researcher Searches Some users of the system 100 may periodically be interested in finding opportunities for collaboration between external organizations (e.g., organization-to-organization) or between researchers within their own organization (e.g., individual-to-individual). As such, the system 100 can identify matches between organizations or between in-organization researchers through application of the same processes described above that the system 100 uses to find potential matches between university researchers and organizations.

4. Add and Save Search Tags to Faculty Profiles and Organization Websites

Although they are much faster than traditional researcher and organization searches due to the use of edge lists, searches performed by the system 100 can still take time. Intense searches in which the user is reading extensive profile and website information can be time consuming. In order to avoid duplicating searches, users can save elements of their searches by tagging faculty that have certain keywords and saving these tags for later use. In particular, as shown in the third interface 210C of FIG. 4C and the fourth interface 210D of FIG. 4D, the system 100 can receive information indicative of one or more user-defined tags from a user, and can further receive information indicative of one or more entities identifiable within the database 220 to associate with the user-defined tag. For example, if a user searches the system 100 for faculty that work on "climate change," the user can tag one or more selected profiles of these faculty under a "climate change" tag. The system 100 can "save" a list of profiles (e.g., entities) that the user has associated with the "climate change" tag. The next time the user performs a "climate change" search, instead of repeating the search from scratch, the user can select the "climate change" tag and the system 100 can quickly retrieve the information for the entities that the user has saved under the "climate change" tag. Tags can be at the discretion of the user and are not limited to keywords. For example, if a user is searching for keynote speakers for a meeting or conference, they can apply a "keynote speaker" tag (e.g., "Conference A Keynote Speakers") to potential speakers identified within the database 220 and save the profiles of these speakers for later. In some embodiments, the system 100 can export information pertaining to each entity identified under a user-defined tag for ease of access by the user (e.g., a "roster"). Tags can be added and removed at the discretion of the user, and the system 100 can be configured to save a plurality of user-defined tags for each respective user. In some embodiments, the system 100 can enable sharing of tags between users of the system 100. The purpose of the user-defined tags is to save users time and limit the need to conduct redundant searches that waste time.

5. Export Search Feature

In addition to saving searches, users will periodically want to export their searches. For example, a user doing a search of potential invitees for an event will want to export the list of potential invitees. As such, the system 100 can be operable to export information about the one or more identified entities for ease of access by the user. For instance, as shown in the fourth interface 210D of FIG. 4D, the system 100 can export information about one or more entities in the form of one or more .csv (comma separated variable) files, which can include information about each respective entity including but not limited to names, affiliations, identified macro-level topics and/or micro-level topics, "hit counts" indicative of a number of instances of an associated macro-level topic and/or micro-level topic present within the set of textual information, contact information, web address information and links. In some embodiments, this "export data" feature works in conjunction with the tag feature. In practice, the system 100 can enable users to associate one or more user-defined tags to faculty and organizations that they want to invite to the event. The user can then click an "Export" button within the user interface 210 of the system 100 that exports not only the name of the entity, but also additional attribute data including publicly available contact information, department, their expertise area, and tag the user has identified. The list of saved names, attributes, and other search-related data can be exported as a .pdf document, a .csv spreadsheet, or another suitable file type. In some embodiments, if multiple files are needed to convey the information, the system 100 can be configured to combine one or more files into a .zip file for ease of download and/or access by the user.

6. Email Feature

In some embodiments, as shown in the fourth interface 210D of FIG. 4D, the system 100 can include an email feature that can work in conjunction with the export search feature. If, for example, the user obtains a list of entities, the email feature can automatically set up a group email to each entity identified in the saved search and/or underneath a user-defined tag. As such, the system 100 can communicate with an email server or application to automatically facilitate email communication between the user and one or more entities identifiable within the database. A user can employ this feature to find potential invitees for an event and then send them a group email regarding the event.

7. Multi-Keyword Search Feature

With reference to the first interface 210A of FIG. 4A and the fifth interface 210E of FIG. 4E, it is anticipated that users may have a list of keywords (e.g., a set of topic parameters) for which they would like to conduct searches. They may want to conduct a search in which they need to find potential partners that match multiple keywords. Instead of searching one keyword at a time, the system 100 can include a "multi-keyword search" feature that receives a list of keywords (e.g., information indicative of a set of topic parameters 320 including a plurality of macro-level topic parameters 322 and/or a plurality of micro-level topic parameters 324) from the user. The system 100 conducts the search within the database 220 according to the list of keywords.

With reference to FIG. 4A, the system 100 can generate, based on the co-occurrence matrices 330, one or more network diagrams 212 for display to the user at the user interface 210. The one or more network diagrams 212 can include subsets of information within the co-occurrence matrices 330 that pertain to the set of topic parameters 320 entered by the user during the search. In one aspect, the one or more network diagrams 212 can include columns or nodes that display counts of a number of times each respective macro-level topic parameter and/or micro-level topic parameter appears in the set of textual information associated with each respective entity. In some embodiments, the system 100 can rank or otherwise organize one or more elements of the one or more network diagrams 212 such that the "most relevant" entities are placed first. In another aspect, the system 100 can receive a set of viewing preferences from the user that determine how the one or more elements of the one or more network diagrams 212 are ranked, displaced, and/or organized. As such, the system 100 can re-organize and display the one or more network diagrams 212 according to the set of set of viewing preferences. This way, they can easily determine which potential partners have matches across multiple macro-level topic parameters and micro-level topic parameters. In addition to the match information, the system 100 can append attribute data columns for each respective entity identified within the one or more network diagrams 212 (e.g., organization names, affiliations, roles, web addresses, etc.) to the columns so that users have easy access to information regarding the potential partner matches. In one example shown in FIG. 4A, one network diagram 212 can show connections between an individual and a plurality of organizations that have the most matching macro-topics and/or micro-topics ("Prof A.", under a "FACULTY TO ORG" tab, showing ten "nodes" that represent a top ten organizations). Another option can instead show connections between an organization and a plurality of individuals that have most matching macro-topics and/or micro-topics. In some embodiments, a threshold value for displayed nodes or elements (ten, in the example shown in FIG. 4A) can be set by a user or administrator.

As such, the system 100 can generate and display the one or more network diagrams 212, which can be visual illustrations that show relationships between researchers/organizations and keywords, Note that the system 100 can have a limit to the quantity of elements that can be displayed or otherwise visualized, beyond a certain quantity of elements, the visualization can become too "busy" such that it no longer conveys useful information. As such, in some embodiments, the limit to the quantity of elements that can be displayed can be set by a user or an administrator. This information enables users to see the connections between potential partners and areas of expertise.

8. Document Matching Feature

With further reference to the fifth interface 210E of FIG. 4E, it is anticipated that users of the system 100 will have different types of search needs. One such need is the capacity to search for potential partners that match project and partnership descriptions. The system 100 can include a document-matching feature that enables a user to upload a document that includes a written description of a project or an event and will use one or more topic parameters 320 present in the written description to search for one or more entities represented within the database 220 that are associated with the one or more topic parameters 320. In particular, the system 100 can receive a document including text indicative of the set of topic parameters 320 including the one or more macro-level topic parameters 322 or the one or more micro-level topic parameters 324, and can apply a document matching methodology and/or a natural language processing methodology to extract information indicative of the set of topic parameters including the one or more macro-level topic parameters or the one or more micro-level topic parameters present within the document. Following identification of the set of topic parameters 320 from the document, the system 100 can then query the database 220 to identify one or more selected entities 352 represented within the database 220 that are associated with the set of topic parameters 320.

Note that while the above document-matching feature is discussed in terms of a project or event proposal, the system 100 can also apply the natural language processing methodology during searches to provide information about one or more organizational goals that an entity focuses on. For example, the United Nations (UN) presently has 17 Sustainable Development Goals (SDGs) that are published on their website and other publicly accessible text materials, each of these SDGs are associated with a write-up that describe each SDG and provide information about specificities of each SDG. As such, each SDG can have a plurality of associated macro-level topics and/or micro-level topics. Other organizations, such as universities, can also have a set of organizational goals that can be associated with one or more macro-level topics and/or micro-level topics. The system 100 can maintain organizational goal information associated with a set of organizational goals within the set of textual information 310, and can apply one or more natural language processing methodologies to the set of organizational goal information to identify one or more macro-level topics and/or micro-level topics identifiable within each organizational goal. The system 100 can then leverage the one or more macro-level topics and/or micro-level topics identifiable within each organizational goal to display, for an entity, information about one or more organizational goals that align with the entity, and can also leverage the one or more macro-level topics and/or micro-level topics identifiable within an organizational goal to search for entities that are associated with the organizational goal.

For instance, for a thirteenth UN SDG: "Take Urgent Action to Combat Climate Change and its Impacts", the system 100 can apply one or more natural language processing methodologies to a set of information associated with the thirteenth UN SDG and extract one or more macro-level topics and/or micro-level topics. Example topics and n-grams that the system 100 could extract can include "climate change", "atmosphere", "sea level" "drought" "$CO_2$ Emissions" "extinction", etc. The system 100 can then provide options to the user to search for entities that are associated with these macro-level topics and/or micro-level topics. Optionally, when the system 100 is displaying information about an entity following a search, the system 100 can identify one or more organizational goals that align with the entity based on common macro-level topics and/or micro-level topics, and can display this information to the user. The system 100 can also include this information in any exported files associated with the entity.

Knowledge Alliance Tool Use Case Scenarios

The following scenarios illustrate not only how the system 100 works, but how the system 100 can save users time and effort in their work to find potential partners, meeting attendees, keynote speakers, and other types of partners.

1. Workshop and Meeting Organization Use Scenario

The system 100 has multiple uses. The following is an explanation of how the system 100 can be used to facilitate the process of identifying participants for events. University commitment to community embeddedness entails organizing meetings, workshops, and other events in which university faculty/researchers exchange information with other entities including organizations, government agencies, and other members of the community. Often, a primary goal of these meetings is to bring together diverse groups of people with different types of expertise. Event planners frequently need to identify people for different meeting/workshop roles, including: presenters, panelists, keynote speakers, as well as other types of participants and attendees.

Within a university environment, this often means searching for professors and researchers from a variety of schools, departments, and centers. However, a goal of many workshops and meetings is to identify people not solely based on their unit of employment, but also based on their shared interests. Although there are existing tools designed to identify people within an enclosed organization environment based on personal interests, such as ISearch to search for faculty/researchers/employees within the organization, none of these tools are designed to find people based on their macro-level or micro-level shared interests.

As a result, people are often compelled to combine tools like ISearch with efforts that include their own personal networks at their organization, LinkedIn searches, and word-of-mouth inquiries. Not only are these approaches time consuming, but they may also miss some important interests that employees within the organization have in common. Word-of-mouth searches may lead to situations in which only a select group of high-profile ASU faculty and researchers are selected to participate in events. This can lead to an overload of requests for some experts while at the same time hampering the growth of emerging researchers and faculty by limiting their opportunities for engagement.

In addition to in-organization experts, meeting and workshop planners often want to invite external entities including people and organizations from outside the organization, such as local non-profits. In some cases, individuals from these organizations are sought as panelists, presenters, and local subject matter experts. In other cases, they are invited due to their potential interest in the meeting's subject matter. Since meetings and workshops often lead to more enduring partnerships, it is essential to have tools that improve the quality of these searches. Currently, there appears to be no other tool with the capacity to identify shared interests of in-organization researchers and external organizations that can directly facilitate development of participant lists or rosters for meetings, workshops, and other events.

As a result, event planners usually resort to strategies including Google searches, word-of-mouth suggestions, brainstorming with event sponsors, and other strategies that draw from limited information sources. Not only are these approaches time consuming, but they may also miss key shared interests that potential attendees and organizations have in common with each other and with in-organization experts. Word-of-mouth searches may lead to a similar problem that occurs with in-organization expert word-of-mouth searches, the same high-profile organizations are selected to participate in events, leading to an overload of requests for people in some organizations while hampering the efforts of people in smaller or less well-known organizations to engage with in-organization experts.

The system 100 can facilitate the process of identifying participants for meetings, workshops, and events. The system 100 also improves the capacity of event planners to identify participants in several ways. First, the system 100 enables users to understand the macro-level topics that interest various entities including external organizations and in-organization individuals such as faculty/researchers. Second, the system 100 makes it possible for users to find the micro and macro-level interests that in-organization personnel and external organizations have in common.

To understand the how the system 100 works and the benefits it provides, it is instructive to illustrate an example of how events and workshops are currently organized. Then, this process will be illustrated with an example of event planning that incorporates the system 100.

Current Process of Organizing Meetings and Workshops

Below is a list of the steps that staff often take to organize "Hunch Lunch" events without the aid of the system 100. Combined, these steps require about twenty hours of work.
1. Convene a meeting to identify an event theme with advisors/sponsors—choice is based on the discussion of current events, priorities, challenges (not data-driven or inspired) (~2 hours).
2. From the theme, brainstorm with sponsor's communications expert, leadership, and staff about potential panelists for the flash talks—look up in google, linked in, or other places to verify details on the person's expertise to see how and whether it fits (~5 hours).
3. Search in-organization networks (such as ISearch) for the theme to fill in perspectives that may be slightly different from those from the brainstorm—look up in Google, LinkedIn, or other places to verify details on the person's expertise to see how and whether it fits (~2 hours).
4. Look in an internally-maintained contact database to see if there are appropriate names to fit the themes—look up in Google, LinkedIn, or other places to verify details on the person's expertise to see how and whether it fits (~2 hours). This step can require organizers to have a previous knowledge of "who's who", e.g., which names fit under which topics.
5. Start making queries with the first round of names (~3 hours).
6. Confirm those who are available and interested in participating (~3 hours).
7. Keep a running account of diversity—in terms of topics and demographics (~1 hour).
8. Assure that ⅓ of participants are from within the organization and ⅔ of participants are from the community, do more research to fill in missing or declined panelists according to balance (~1 hour).
9. Once a suitable number of speakers are reached—set the agenda and list in some kind of order that is logical (large to small scale; qualitative to quantitative; etc.) and mixes organization panelists in with community panelists (~1 hour).

Organizing Meetings and Workshops with the System

Below is a list of the steps for organizing an event with the system 100.
1. Convene a meeting to identify an event theme with advisors/sponsors—choice is based on the discussion of current events, priorities, challenges (not data-driven or inspired) (~2 hours). This process will include identifying search terms (e.g., macro-level and micro-level topic) that describe the theme. While researching, a user can assign custom user-defined tags for each entity they identify that fits a particular search topic or keyword. This will help them identify entities (e.g., individuals and/or organizations) in future with no extra effort. And, the user will also have ability to export information pertaining to each user-defined tag they created. For example, if the user searches for "food pantry" and identifies multiple matches in a profile for an entity, they can add a user-defined tag (e.g. "food pantry") which is saved in the database 220, and can associate the entity with the user-defined tag. When the user visits the profile for the entity in the future it will show all the tags which are associated with that entity. In another aspect, the user can select a plurality of entities to be associated with the user-defined tag. This will help the user to minimize the time for future searches. In one example implementation, the user can create as many tags they like but can only assign a select number of tags for each entity profile.
2. From the theme and search term list, brainstorm with sponsor's communications expert, leadership, and staff about potential panelists for the flash talks.

With initial information from steps 1 and 2, there are several ways the system 100 can be used to identify entities to participate in events, meetings, workshops, etc. These include: 1) Keyword focused searches, 2) ASU personnel searches, 3) Organization searches, 4) UN Sustainable Develop Goal searches, 5) Project/Proposal Matching Searches, and 6) Multi-keyword Search Feature.

To provide an idea of the scale of searches enabled by the system 100, Table 1 provided below shows quantities of data maintained within the database 220 for one current implementation of the system 100. Around 1.8 TB-2 TB of data were generated including co-occurrence matrices and edge lists during construction of one implementation of the system 100. Using the system 100, coordinators and researchers can more easily traverse the vast amount of available data in order to identify and facilitate potential partnerships.

TABLE 1

DATA QUANTITIES

| Data Type | Quantity |
|---|---|
| Total Faculty/Researchers | 8949 |
| Nonprofit Organizations websites | 6020 |
| Unique Bigrams | 18,339,344 |
| Faculty/Org To Bigrams (Records) | 52,142,611 |
| Org To Faculty Maps for shared topics (Records) | 34,497,430 |

Additional Use Case Scenarios

The system 100 has many uses beyond just convening meetings and workshops. The system 100 will also be useful to identify potential opportunities for collaboration between entities within an organization (e.g., "in-organization" entities, such as pairing a faculty member with a sub-organization where both are affiliated with the same university) and also potential opportunities for collaboration between "in-organization" entities and one or more external entities (for instance, pairing a faculty member of a university with non-profits or researchers that are not directly affiliated with or considered part of the university) on proposals, publications, patents, and any other type of collaborative project or endeavor.

Approach #1: Keyword Focused Search

Continue from steps 1 and 2 from the Organizing Meetings and Workshop with the System section above.
3. Conduct a keyword search within the system 100 using the words developed to describe the event theme in Steps 1 and 2 (e.g., using macro-level topic parameters and micro-level topic parameters corresponding to the event).
4. Searching by keywords enables users to identify both in-organization entities that have these keywords in their profiles and websites. In one step taken by the user, the system 100 can provide lists of in-organization entities that may be good fits to participate in activities associated with the search terms. The system 100 identifies and displays information about these entities including links to personnel profiles, online profiles such as Google scholar (if available), organization websites, and key contact information for both. This means users can quickly determine if the people/organizations are good fits based on a more thorough analysis of their online descriptions. Because the system 100 can pre-identify this information through the co-occurrence matrix and maintain this information within the database 220, search results can be identified and provided relatively quickly.

5. The system 100 an provide another search option that enables users to generate lists of in-organization entities that have selected keywords (e.g., macro-level topic parameters or micro-level topic parameters) on their profiles and websites. The system 100 counts the number of times the associated keyword appears on each website/profile for each entity to provide a measure of the level of interest that each entity has in that keyword. These features will help users determine which entities may be the best fit for the event they are planning.

Approach #2: In-Organization Expert (Individual) Focused Search

Continue from steps 1 and 2 from the Organizing Meetings and Workshop with the System section above 3. Conduct a search in the system 100 with the initial list of names derived from Step 2. The system 100 provides links to in-organization profile information for each individual identified by the system 100. Therefore, it is easy to determine if the individuals from the initial list of names generated in Step 2 fit the event theme and keywords.

However, since the list of names from the meeting in Step 2 might primarily include high profile, well-known researchers, the system 100 can be used to identify other in-organization individuals that have the same interests as the entities identified in Step 2. This is one way to ensure that emerging faculty/researchers have the opportunity to participate in events and to lessen the burden on high-profile personnel.

4. When users enter the names generated in Step 2, the system 100 provides the option to perform a search of the database 220 to identify in-organization individuals with shared interests as those identified within the initial list of names. This option will make it possible to expand in-organization individual searches beyond lists of well-known and high-profile personnel.

Approach #3: Organization Focused Search

Continue from steps 1 and 2 from the Organizing Meetings and Workshop with the System section above 3. Conduct a search by the system 100 with the initial list of organization names derived from Step 2. The system 100 provides links (e.g., web addresses) to the websites for each entity identified by the system 100. Therefore, it is easy to determine if the organizations generated in Step 2 fit the event theme and keywords.

However, since the list of names from the meeting in Step 2 may be comprised primarily of high profile, well-known organizations, the system 100 can be used to identify other organizations that have the same interests as those identified in Step 2. This is one way to ensure that smaller and less well-known organizations have the opportunity to participate in events and to lessen the burden on high-profile organizations and those that already have many partnerships.

4. When users enter the names of organizations generated in Step 2, they have the option to search to identify one or more organizations with shared interests.

Approach #4: United Nations Sustainable Development Goals Search

The UN SDGs provide benchmarks that are guiding much of the work conducted by university researchers and local or international non-profit organizations. At present, the UN SDGs include seventeen goals include efforts to reduce poverty, increase access to clean water, tackle the challenges of climate change, and other goals designed to be reached by 2030. As part of its search output, as discussed above, the system 100 can indicate which SDGs match the descriptions of each ASU researcher or non-profit organization. This means that users will be able to search for partners based on the degree to which their profiles/websites match the descriptions for each of the seventeen SDGs.

Approach #5: Project/Proposal Matching Searches

In one aspect, the system 100 can also enable users to input a text document including a project proposal or research description and use the text document to identify entities with matching interests. In one implementation example, the user can upload a document (e.g., in the form of a .pdf file, .docx file, .txt file, etc.) and the system 100 can apply one or more natural language processing techniques to identify one or more (e.g., macro-level topic parameters or micro-level topic parameters) and then search the database 220 to identify entities whose profiles and websites have the highest text matching correlations. This feature augments the search capacity of the system 100 beyond specific keyword searches by enabling users to search based on larger bodies of text with more complex combinations of keywords.

Approach #6: Multi-Keyword Search Feature

In one aspect, users can upload a plurality keywords (e.g., a plurality of macro-level topic parameters and/or micro-level topic parameters) in bulk and the system 100 can generate search results based on the plurality of macro-level topic parameters and/or micro-level topic parameters in the form of a result co-occurrence matrix which shows counts of the number of times each macro-level topic parameter and/or micro-level topic parameter are present in the set of textual information associated with each respective entity (e.g., researcher profiles and organization websites). The system 100 can also append researcher and organization attribute data to the keyword search results. The system 100 can aggregate this information into one or more files, typically in .csv form (although other implementations are possible where the information is aggregated into a .pdf, docx, .xlsx, etc., and can also include a .zip file with one or more documents included therein). Once complete, the users are notified where they can download the processed file with all the information. This feature provides the ability to the user to search for multiple keywords efficiently. This feature enables users to quickly identify researchers and organizations that match multiple keywords.

System Implementation Details

Figure 2A:
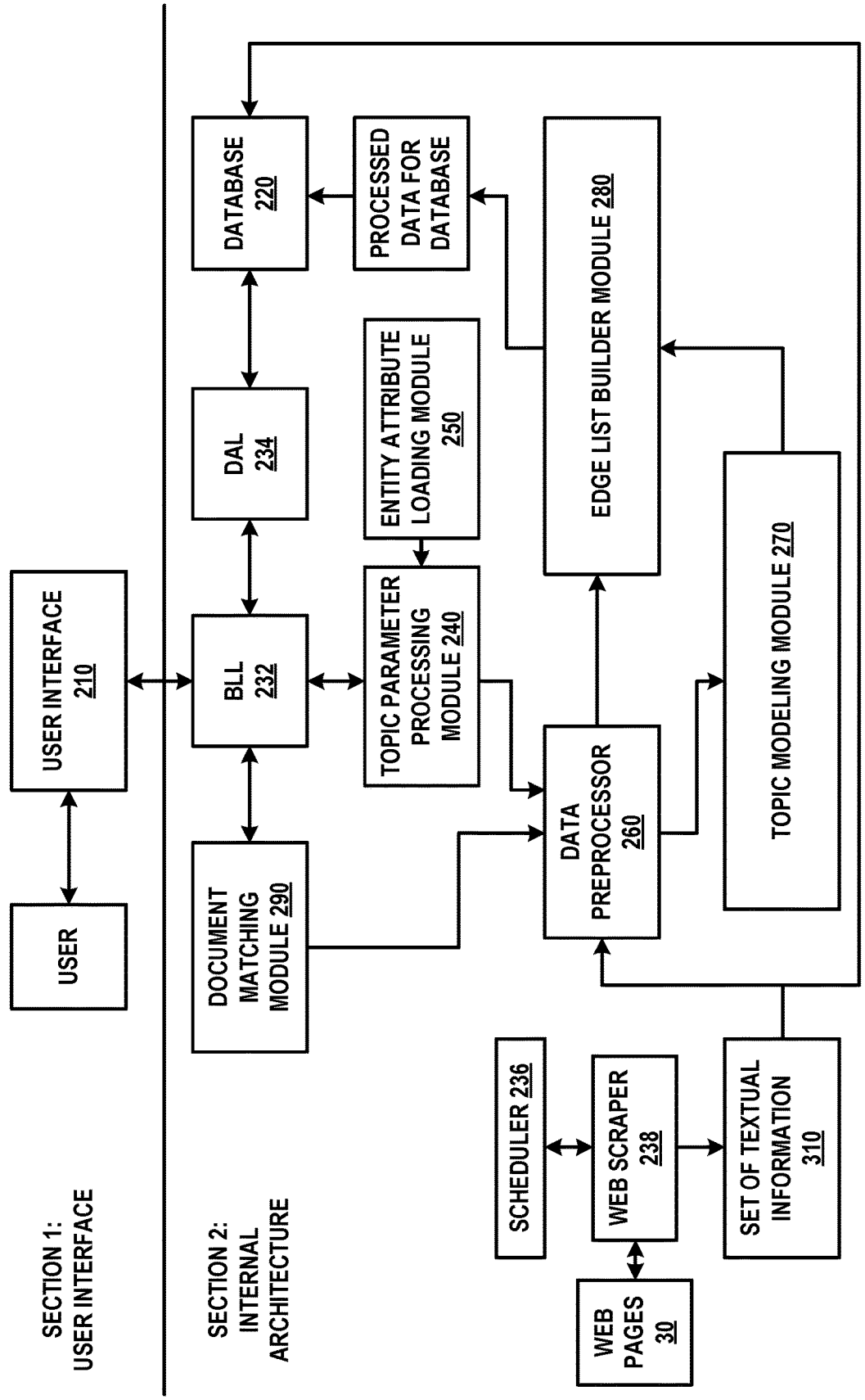
FIGS. 2A and 2B are a pair of simplified block diagrams showing various components of the system of FIG. 1.
Figure 2B:
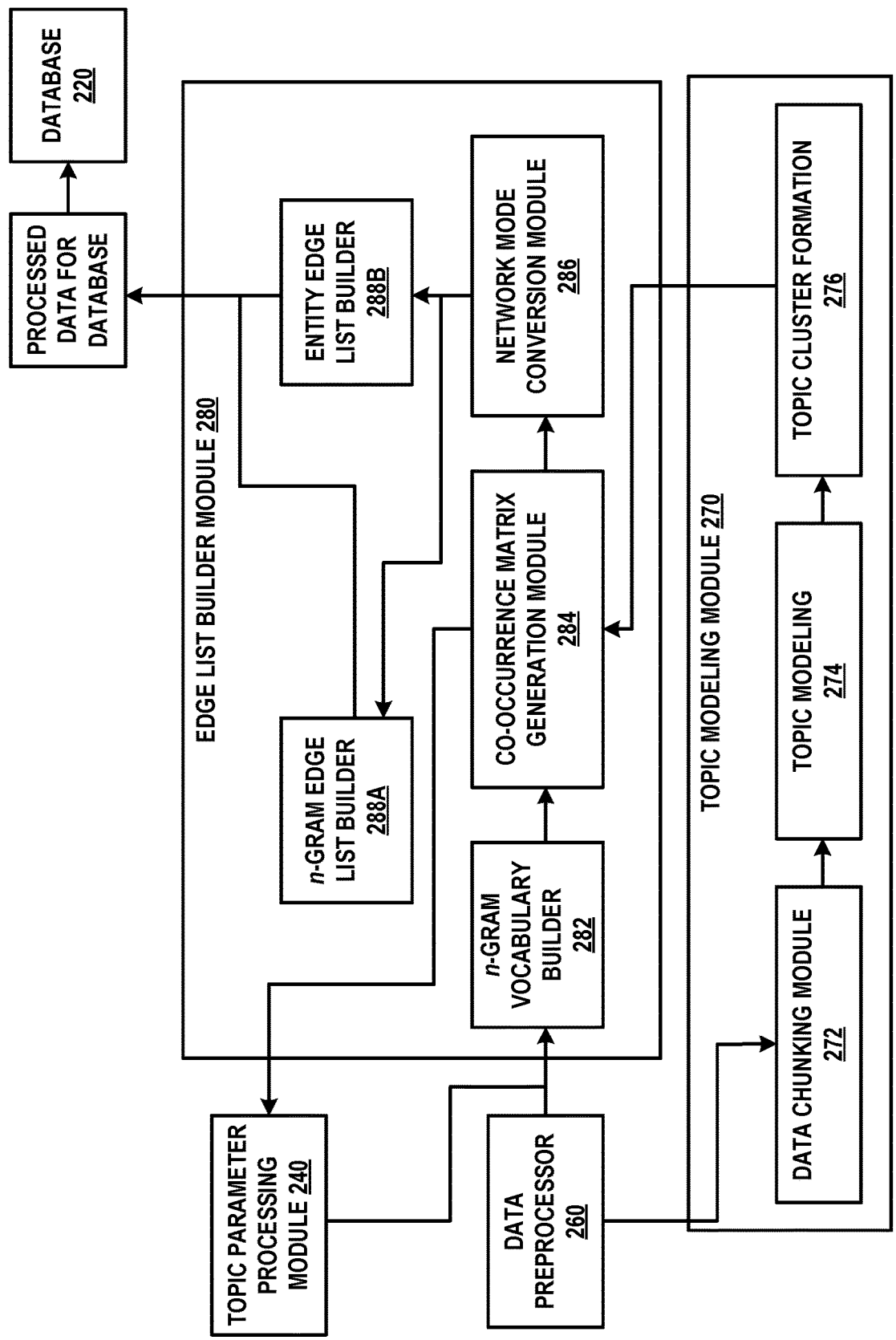
Figure 3:
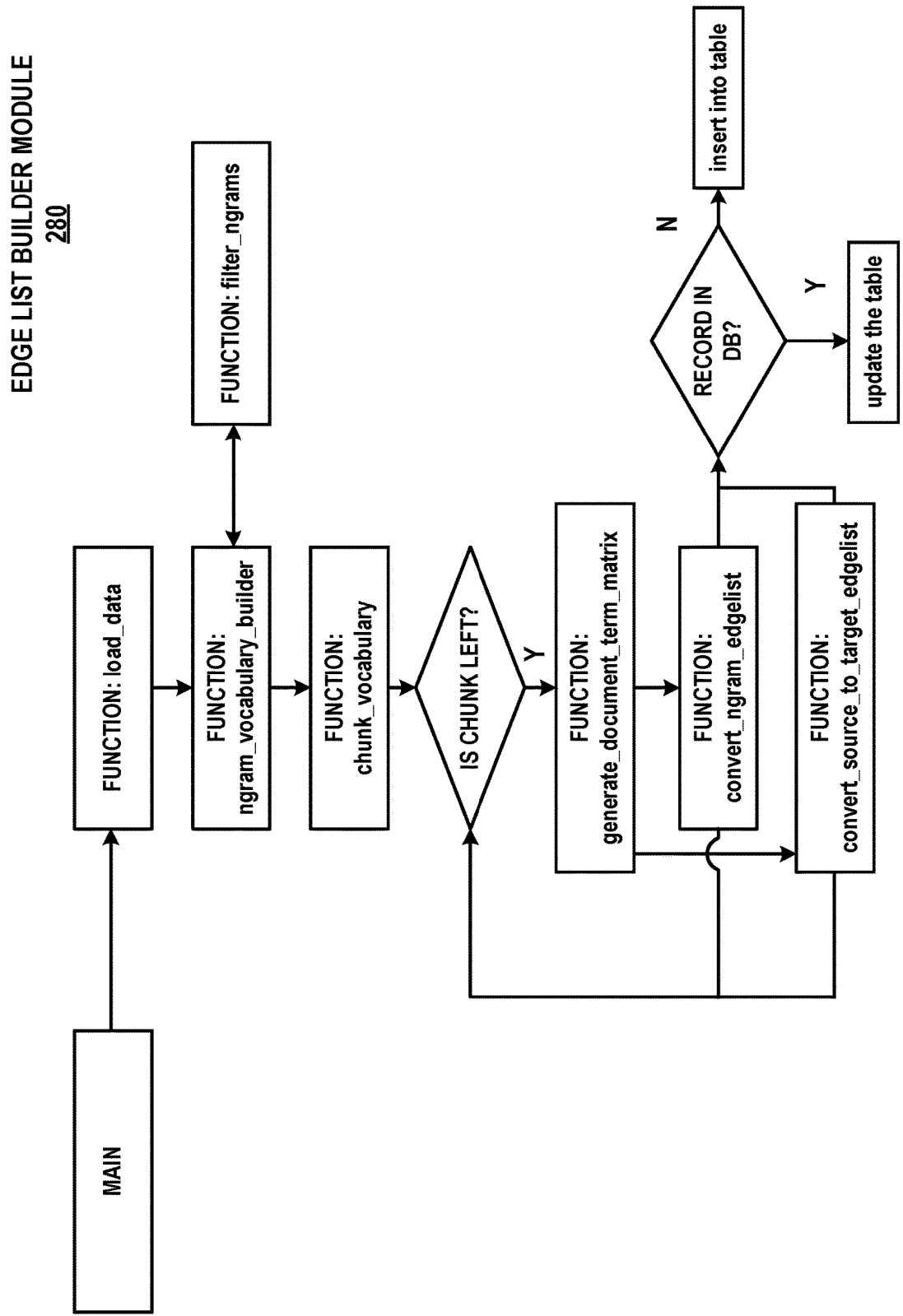
FIG. 3 is a simplified flow diagram showing a process for building edge lists implemented by the system of FIG. 1.

FIGS. 2A-3 show a series of simplified block diagrams for implementation of the system 100.

With reference to FIG. 2A, the system 100 includes the user interface 210 that a user can communicate with to interact with the system 100 including entering the set of topic parameters 320 and viewing results.

The user interface 210 can communicate with a business logic layer (BLL) 232 and a data access layer (DAL) 234 to enter the set of topic parameters 320 and view results. The business logic layer 232 can communicate with a topic parameter processing module 240 that processes the set of topic parameters 320 to conduct searches. The data access layer 234 enables the user interface 210 (and the business logic layer 232) to communicate with the database 220, which includes information including but not limited to the set of textual information 310, the plurality of entities 312, the co-occurrence matrices 330, and the edge lists 340.

The topic parameter processing module 240 performs initial topic parameter processing functionalities that enable searching of keywords (e.g., the set of topic parameters 320 including macro-level topic parameters 322 and micro-level topic parameters 324). The topic parameter processing module 240 can also communicate with an entity attribute loading module 250 that loads entity information including faculty and organization attributes present within the database 220 for display at the user interface 210.

The system 100 further includes a web scraper 238 that communicates with a scheduler 236 to extract the set of textual information 310 from one or more web pages 30 that house information about each entity 312 represented within the database 220. As discussed, the set of textual information 310 includes one or more macro-level topics or one or more micro-level topics for each entity 312, and can also include web addresses, webpage text data, and contact information.

The system 100 includes a data preprocessor 260 that prepares the set of textual information 310 for topic modeling and for building the one or more edge lists 340. The data preprocessor 260 can also communicate with the topic parameter processing module 240 to receive the set of topic parameters 320 for searching within the set of textual information 310. The system 100 further includes a topic modeling module 270 that communicates with the data preprocessor 260 to identify one or more macro-level topics or one or more micro-level topics for each entity 312 based on the set of textual information 310. In particular, the topic modeling module 270 can apply one or more natural language processing methodologies to identify one or more macro-level topics or one or more micro-level topics within the set of textual information 310 for each entity 312.

The system 100 further includes an edge list builder module 280 that generates the one or more edge lists 340 based on the one or more macro-level topics or one or more micro-level topics within the set of textual information 310 for each entity 312 identified by the topic modeling module 270. The edge list builder module 280 can also communicate with the data preprocessor 260 to receive information about micro-level topics (e.g., n-grams) for searching. The output of the edge list builder module 280 can include processed data for inclusion in the database 220, which can include co-occurrence matrices 330 but also includes the one or more edge lists 340.

FIG. 2B shows various sub-modules of the topic modeling module 270 and the edge list builder module 280. In particular, the topic modeling module 270 includes a data chunking module 272 that communicates with the data preprocessor 260 to receive the set of textual information 310 for one or more entities 312. The topic modeling module 270 further includes a topic modeling sub-module 274 that applies the one or more natural language processing techniques to identify one or more macro-level topics or one or more micro-level topics for each entity 312 based on the set of textual information 310. Following identification of one or more macro-level topics or one or more micro-level topics by the topic modeling sub-module 274, the topic modeling module 270 includes a topic cluster formation module 276 that "clusters" topics together for easier identification of one or more macro-level topics or one or more micro-level topics for each entity 312 based on the set of textual information 310.

The edge list builder module 280 includes an n-gram vocabulary builder 282 that maintains a listing of n-grams (e.g., micro-level topics) present within the database 220. The n-gram vocabulary builder 282 can communicate with the topic parameter processing module 240 to receive the set of topic parameters 320 and can also communicate with the data preprocessor 260 to receive information about micro-level topics (e.g., n-grams) for searching. The edge list builder module 280 further includes a co-occurrence matrix generation module 284 that generates co-occurrence matrices 330 based on the results of the topic modeling module 270 and the n-gram vocabulary builder 282 (specifically, the topic cluster formation module 276 for macro-level topics and the n-gram vocabulary builder 282 for micro-level topics). The co-occurrence matrix generation module 284 can report back to the topic parameter processing module 240 to provide information about topics found within the set of textual information 310. The output of the co-occurrence matrix generation module 284 is then passed to a network mode conversion module 286 that sets up or otherwise processes the co-occurrence matrices 330 to aid in generation of the one or more edge lists 340. Finally, the network mode conversion module 286 communicates with an n-gram edge list builder 288A and an entity edge list builder 288B that respectively generate edge lists 340 by micro-level topic and by entity (e.g., for shared macro-level topics and micro-level topics across entities). The edge lists 340 are included in the set of processed data that is provided to the database 220.

Referring back to FIG. 2A, the system 100 can include a document matching module 290 that receives documents from the BLL 232 for matching with the set of processed data within the database 220. The document matching module 290 can include a machine-learning based natural language processing model that extracts a plurality of keywords (e.g., the set of topic parameters 320) for searching. The document matching module 290 can also be applied to extract information related to organizational goals, proposals, project descriptions, etc. such that a user need not manually identify specific key words from these documents for searching. The document matching module 290 can communicate with the data pre-processor 260 to provide topics and other information for searching and/or for construction of the edge lists 340.

FIG. 3 in particular shows a process for generating the one or more edge lists 340 by the edge list builder module 280. Algorithm 1 below shows the process for generating the one or more edge lists 340 that corresponds to the diagram of FIG. 3.

Algorithm 1: Generating Edge Lists from Co-Occurrence Matrix

```
   MAIN: Edgelist Creation
1  vocabulary = Ngram_Vocabulary_Builder
2  Create N equal size chunks = chunk_vocabulary
3  LOOP chunks:
4     matrix = Create_Document_Term_Matrix
5     ngram_edgelist = Convert_NGram_Edgelist
6     LOOP ngram_edgelist
7        IF item present in database:
8           UPDATE
```

| Algorithm 1: Generating Edge Lists from Co-Occurrence Matrix |
| --- |
| 9      ELSE |
| 10        Insert item to database |
| 11      source_target_edgelist = Convert_Source_To_Target_Edgelist |
| 12      LOOP source_target_edgelist |
| 13        IF item present in database: |
| 14          UPDATE the weight |
| 15        ELSE |
| 16          Insert item to database |
|     FUNCTION: FilterNgrams(text) : |
| 1      DEFINE acceptable_types |
| 2      Tag POS |
| 3      Filter based on acceptable_types |
| 4      return value |
|     FUNCTION: Ngram_Vocabulary_Builder : |
| 1      Tokenize the words |
| 2      Lemmatize the words |
| 3      FindNgrams Frequency and sort by Frequency |
| 4      Ngrams = FilterNgrams(tokens) |
| 5      return Ngrams |
|     FUNCTION: chunk_vocabulary : |
| 1      return n size chunks |
|     FUNCTION: Create_Document_Term_Matrix : |
| 1      nchunks = chunk_vocabulary(ngrams) |
| 2      vectorize with count vectorizer |
| 3      fit vectorizer and transform |
| 4      map nonprofit and researchers to ngrams |
| 5      return matrix |
|     FUNCTION: Convert_NGram_Edgelist : |
| 1      LOAD document matrix to dataframe |
| 2      reshape dataframe having a multi level index with one or more inner most levels |
| 3      rename reshaped data frame columns |
| 4      remove weight equal to 0 |
| 5      return ngram edgelist |
|     FUNCTION: Convert_Source_To_Target_Edgelist : |
| 1      LOAD document matrix to dataframe |
| 2      convert to array and recode greater than 0 to 1 and 0 as 0 |
| 3      calculate dot product of array with transpose of same array |
| 4      convert result to data frame |
| 5      rename the columns |
| 6      remove weight equal to 0 |
| 7      return source to target edgelist |
|     FUNCTION: Load_Faculty_Organization_Attributes : |
| 1      Load faculty and organization attributes |

Methods

Figure 5A:
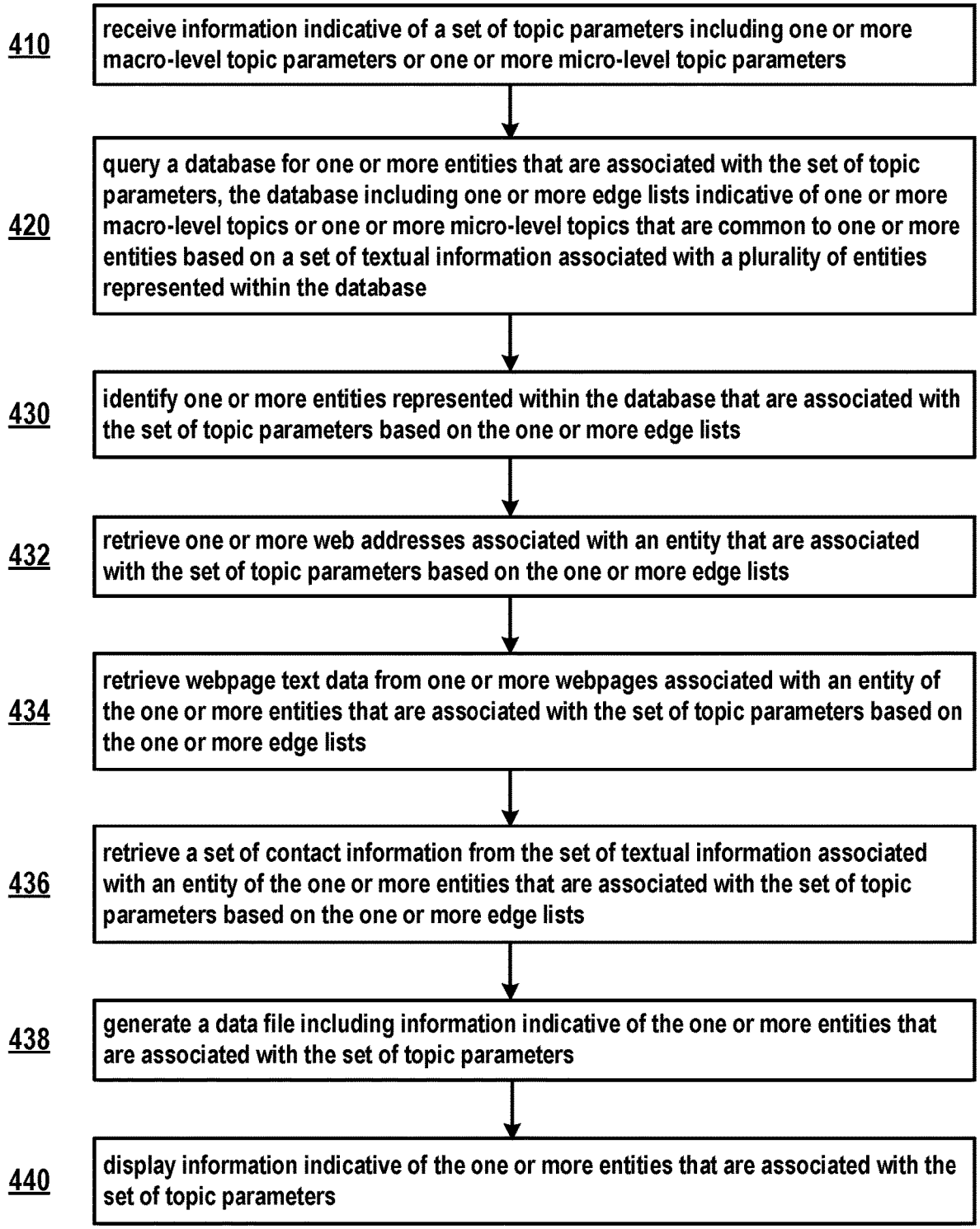

FIG. 5A shows a first process 400 applied by the system 100 for searching and identifying entities based on a set of topic parameters.

Block 410 of process 400 includes receiving, at a processor in communication with a memory of the computing device 102, information indicative of a set of topic parameters including one or more macro-level topic parameters or one or more micro-level topic parameters. Block 420 of process 400 includes querying, at the processor, a database for one or more entities that are associated with the set of topic parameters, the database including one or more edge lists indicative of one or more macro-level topics or one or more micro-level topics that are common to one or more entities based on a set of textual information associated with a plurality of entities represented within the database. Block 430 of process 400 includes identifying, at the processor, one or more entities represented within the database that are associated with the set of topic parameters based on the one or more edge lists. Block 432 of process 400 includes retrieving, at the processor, one or more web addresses associated with an entity that are associated with the set of topic parameters based on the one or more edge lists. Block 434 of process 400 includes retrieving, at the processor, webpage text data from one or more webpages associated with an entity of the one or more entities that are associated with the set of topic parameters based on the one or more edge lists. Block 436 of process 400 includes retrieving, at the processor, a set of contact information from the set of textual information associated with an entity of the one or more entities that are associated with the set of topic parameters based on the one or more edge lists. Block 438 of process 400 includes generating, at the processor, a data file including information indicative of the one or more entities that are associated with the set of topic parameters. Block 440 of process 400 includes displaying, at the processor, information indicative of the one or more entities that are associated with the set of topic parameters.

Figure 5B:
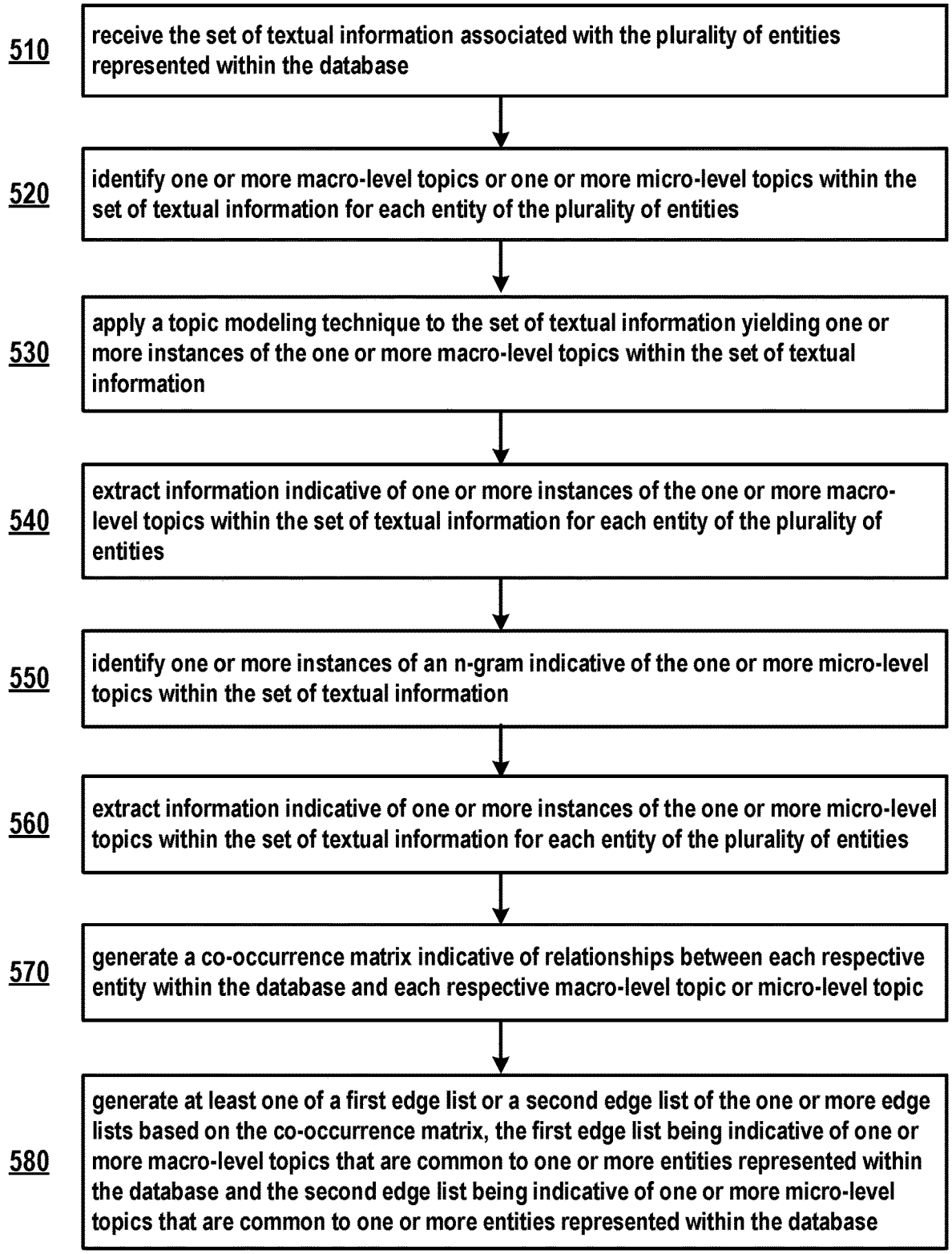

FIG. 5B shows a second process 500 applied by the system 100 for generating edge lists indicating topic connections between entities.

Block 510 of process 500 includes receiving, at the processor, the set of textual information associated with the plurality of entities represented within the database. Block 520 of process 500 includes identifying, at the processor, one or more macro-level topics or one or more micro-level topics within the set of textual information for each entity of the plurality of entities. Block 530 of process 500 includes applying, at the processor, a topic modeling technique to the set of textual information yielding one or more instances of the one or more macro-level topics within the set of textual information. Block 540 of process 500 includes extracting, at the processor, information indicative of one or more instances of the one or more macro-level topics within the set of textual information for each entity of the plurality of entities. Block 550 of process 500 includes identifying, at the processor, one or more instances of an n-gram indicative of the one or more micro-level topics within the set of textual information. Block 560 of process 500 includes extracting, at the processor, information indicative of one or more instances of the one or more micro-level topics within the set of textual information for each entity of the plurality of entities. Block 570 of process 500 includes generating, at the processor, a co-occurrence matrix indicative of relationships between each respective entity within the database and each respective macro-level topic or micro-level topic. Block 580 of process 500 includes generating, at the processor, at least one of a first edge list or a second edge list of the one or more edge lists based on the co-occurrence matrix, the first edge list being indicative of one or more macro-level topics that are common to one or more entities represented within the database and the second edge list being indicative of one or more micro-level topics that are common to one or more entities represented within the database.

FIG. 5C shows a third process 600 for extracting a set of topic parameters based on a document. Block 610 of process 600 includes receiving, at the processor, a document including text indicative of the set of topic parameters including the one or more macro-level topic parameters or the one or more micro-level topic parameters. Block 620 of process 600 includes applying, at the processor, a natural language processing methodology to the document yielding the information indicative of the set of topic parameters including the one or more macro-level topic parameters or the one or more micro-level topic parameters present within the document.

FIG. 5D shows a fourth process 700 for storing user-defined tags for entities within the database. Block 710 of process 700 includes receiving, at the processor, information including a user-defined tag. Block 730 of process 700 includes associating, at the processor, one or more entities of the plurality of entities represented within the database with the user-defined tag. Block 740 of process 700 includes storing, at a database in communication with the processor, a list including information indicative of each entity associated with the user-defined tag.

Note that various steps outlined above with respect to processes 400, 500, 600 and 700 in FIGS. 5A-5D can be combined during implementation and usage of the system 100.

Computing Devices

Figure 6:
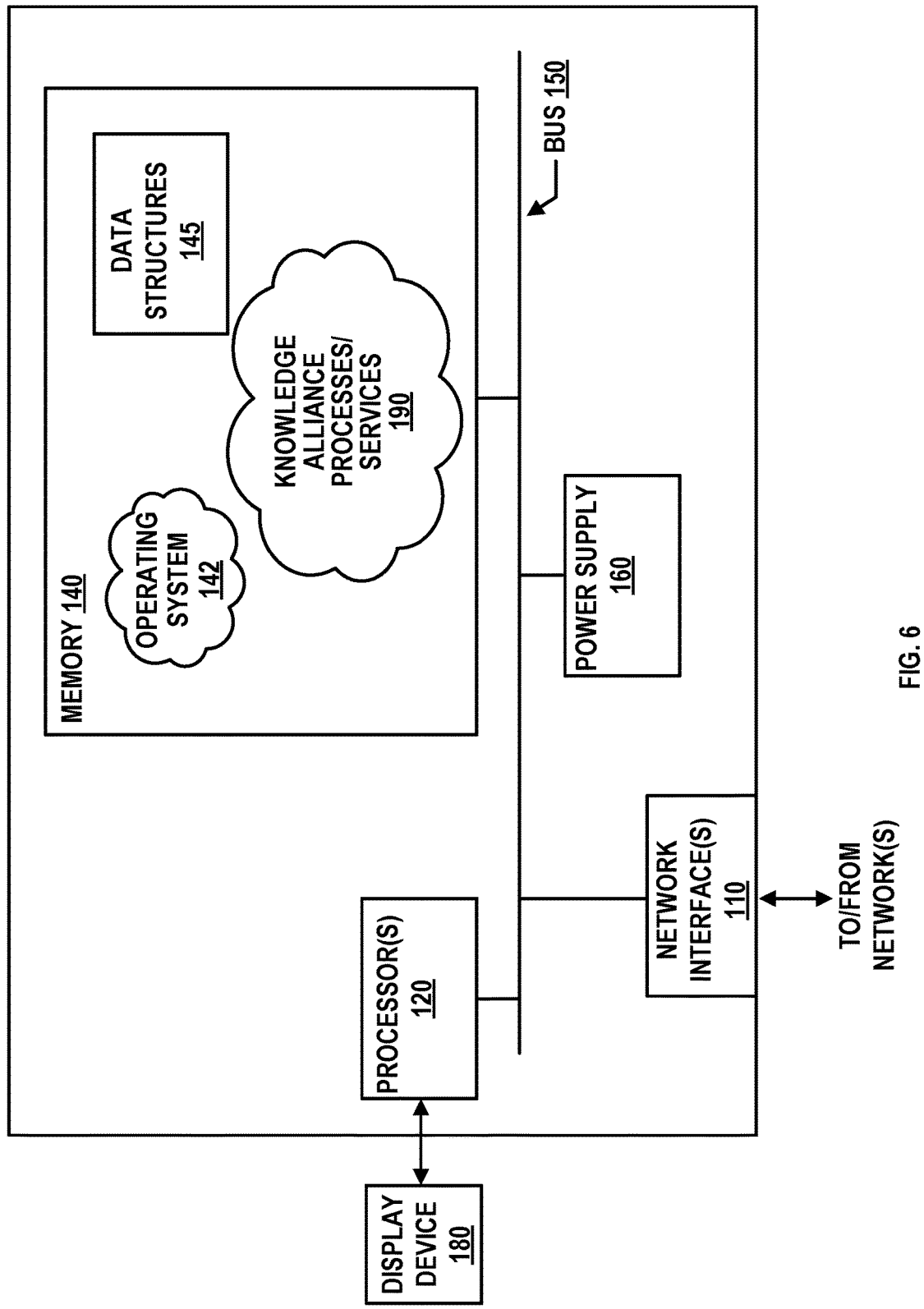
FIG. 6 is a simplified diagram showing an exemplary computing system for implementation of the system of FIG. 1.

FIG. 6 is a schematic block diagram of an example device 102 that may be used with one or more embodiments described herein, e.g., as a component of system 100 shown in FIGS. 1-4E that performs aspects of processes 400, 500, 600 and 700 shown in FIGS. 5A-5D.

Device 102 comprises one or more network interfaces 110 (e.g., wired, wireless, PLC, etc.), at least one processor 120, and a memory 140 interconnected by a system bus 150, as well as a power supply 160 (e.g., battery, plug-in, etc.). The device 102 can include one or more display devices 180 in communication with the processor 120 for displaying information to the user, including information presented at the user interface 210.

Network interface(s) 110 include the mechanical, electrical, and signaling circuitry for communicating data over the communication links coupled to a communication network. Network interfaces 110 are configured to transmit and/or receive data using a variety of different communication protocols. As illustrated, the box representing network interfaces 110 is shown for simplicity, and it is appreciated that such interfaces may represent different types of network connections such as wireless and wired (physical) connections. Network interfaces 110 are shown separately from power supply 160, however it is appreciated that the interfaces that support PLC protocols may communicate through power supply 160 and/or may be an integral component coupled to power supply 160.

Memory 140 includes a plurality of storage locations that are addressable by processor 120 and network interfaces 110 for storing software programs and data structures associated with the embodiments described herein. In some embodiments, device 102 may have limited memory or no memory (e.g., no memory for storage other than for programs/processes operating on the device and associated caches). Memory 140 can include instructions executable by the processor 120 that, when executed by the processor 120, cause the processor 120 to implement aspects of the system 100 and the processes 400, 500, 600 and 700 outlined herein.

Processor 120 comprises hardware elements or logic adapted to execute the software programs (e.g., instructions) and manipulate data structures 145. An operating system 142, portions of which are typically resident in memory 140 and executed by the processor, functionally organizes device 102 by, inter alia, invoking operations in support of software processes and/or services executing on the device. These software processes and/or services may include knowledge alliance processes/services 190, which can include aspects of processes 400, 500, 600 and 700 and/or implementations of various modules described herein including but not limited to the user interface 210, BLL 232, DAL 234, scheduler 236, web scraper 238, topic parameter processing module 240, entity attribute loading module 250, data preprocessor 260, topic modeling module 270 and associated sub-modules, edge list builder module 280 and associated sub-modules, and document matching module 290. Note that while knowledge alliance processes/services 190 is illustrated in centralized memory 140, alternative embodiments provide for the process to be operated within the network interfaces 110, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the knowledge alliance processes/services 190 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, including:
   a processor in association with a memory, the memory including instructions, which, when executed, cause the processor to:
   generate, at the processor and based on application of a natural language processing model to a dataset including research information and entities linked to the research information, a co-occurrence matrix indicative of relationships between topics associated with each respective entity of a plurality of entities represented within the dataset, the co-occurrence matrix denoting a relative relationship strength between entities in terms of a quantity of topics that are common between the entities;
   convert, at the processor, the co-occurrence matrix into one or more edge lists indicative of one or more macro-level topics or one or more micro-level topics that are common to one or more entities;
   extract, at the processor and based on application of a natural language processing model to an input document associated with a research topic, information indicative of a set of topic parameters for inclusion within a query associated with the input document, the information including one or more macro-level topic parameters or one or more micro-level topic parameters;
   query, at the processor, a database in communication with the processor for one or more entities that are associated with the set of topic parameters, the database including the one or more edge lists;
   identify, at the processor, one or more entities represented within the database that are associated with the set of topic parameters based on the one or more edge lists; and
   display, at a display device in communication with the processor, information indicative of the one or more entities that are associated with the set of topic parameters.

2. The system of claim 1, wherein the memory further includes instructions, which, when executed, cause the processor to:
    generate, at the processor, at least one of a first edge list or a second edge list of the one or more edge lists, the first edge list being indicative of one or more macro-level topics that are common to one or more entities represented within the database and the second edge list being indicative of one or more micro-level topics that are common to one or more entities represented within the database; and
    store, at the database in communication with the processor, the first edge list or the second edge list.

3. The system of claim 1, wherein the memory further includes instructions, which, when executed, cause the processor to:
    receive, at the processor, a set of textual information associated with the plurality of entities represented within the database;
    identify, at the processor, one or more macro-level topics or one or more micro-level topics within the set of textual information for each entity of the plurality of entities; and
    store, at the database in communication with the processor, information indicative of one or more instances of the one or more macro-level topics or one or more micro-level topics within the set of textual information for each entity of the plurality of entities.

4. The system of claim 3, wherein the memory further includes instructions, which, when executed, cause the processor to:
    apply, at the processor, a topic modeling technique to the set of textual information yielding one or more instances of the one or more macro-level topics within the set of textual information; and
    extract, at the processor, information indicative of one or more instances of the one or more macro-level topics within the set of textual information for each entity of the plurality of entities.

5. The system of claim 3, wherein the memory further includes instructions, which, when executed, cause the processor to:
    identify, at the processor, one or more instances of an n-gram indicative of the one or more micro-level topics within the set of textual information; and
    extract, at the processor, information indicative of one or more instances of the one or more micro-level topics within the set of textual information for each entity of the plurality of entities.

6. The system of claim 1, wherein the co-occurrence matrix includes data indicative of:
    one or more rows, wherein each respective row of the one or more rows of the co-occurrence matrix is representative of an entity of the plurality of entities;
    one or more columns, wherein each respective column of the one or more columns is associated with a macro-level topic of the one or more macro-level topics or a micro-level topic of the one or more micro-level topics; and
    a plurality of cells, wherein each respective cell of the plurality of cells is associated with a row of the one or more rows and a column of the one or more columns and wherein each respective cell is indicative of a quantity of instances of an associated macro-level topic of the one or more macro-level topics or a quantity of instances of an associated micro-level topic of the one or more micro-level topics identifiable within a set of textual information for an associated entity of the plurality of entities.

7. The system of claim 1, wherein the memory further includes instructions, which, when executed, cause the processor to:
    receive, at the processor, information including a user-defined tag;
    associate, at the processor, one or more entities of the plurality of entities represented within the database with the user-defined tag; and
    store, at the database in communication with the processor, a list including information indicative of each entity of the one or more entities associated with the user-defined tag.

8. The system of claim 1, wherein the memory further includes instructions, which, when executed, cause the processor to:
    retrieve, at the processor, one or more web addresses from a set of textual information associated with an entity of the one or more entities that are associated with the set of topic parameters based on the one or more edge lists.

9. The system of claim 1, wherein the memory further includes instructions, which, when executed, cause the processor to:
    retrieve, at the processor, webpage text data from one or more webpages of a set of textual information associated with an entity of the one or more entities that are associated with the set of topic parameters based on the one or more edge lists.

10. The system of claim 1, wherein the memory further includes instructions, which, when executed, cause the processor to:
    retrieve, at the processor, a set of contact information from a set of textual information associated with an entity of the one or more entities that are associated with the set of topic parameters based on the one or more edge lists.

11. The system of claim 1, wherein the memory further includes instructions, which, when executed, cause the processor to:
    generate, at the processor, a data file including information indicative of the one or more entities that are associated with the set of topic parameters.

12. A method, comprising:
    generating, at a processor in communication with a memory and based on application of a natural language processing model to a dataset including research information and entities linked to the research information, a co-occurrence matrix indicative of relationships between topics associated with each respective entity of a plurality of entities represented within the dataset, the co-occurrence matrix denoting a relative relationship strength between entities in terms of a quantity of topics that are common between the entities;
    converting, at the processor, the co-occurrence matrix into one or more edge lists indicative of one or more macro-level topics or one or more micro-level topics that are common to one or more entities;
    extracting, at the processor and based on application of a natural language processing model to an input document associated with a research topic, information indicative of a set of topic parameters for inclusion within a query associated with the input document, the information including one or more macro-level topic parameters or one or more micro-level topic parameters;

querying, at the processor, a database in communication with the processor for one or more entities that are associated with the set of topic parameters, the database including the one or more edge lists;

identifying, at the processor, one or more entities represented within the database that are associated with the set of topic parameters based on the one or more edge lists; and displaying, at a display device in communication with the processor, information indicative of the one or more entities that are associated with the set of topic parameters.

13. The method of claim 12, further comprising:

generating, at the processor, at least one of a first edge list or a second edge list of the one or more edge lists, the first edge list being indicative of one or more macro-level topics that are common to one or more entities represented within the database and the second edge list being indicative of one or more micro-level topics that are common to one or more entities represented within the database; and storing, at the database in communication with the processor, the first edge list or the second edge list.

14. The method of claim 12, further comprising:

receiving, at the processor, a set of textual information associated with the plurality of entities represented within the database; and identifying, at the processor, one or more macro-level topics or one or more micro-level topics within the set of textual information for each entity of the plurality of entities.

15. The method of claim 14, further comprising:

applying, at the processor, a topic modeling technique to the set of textual information yielding one or more instances of the one or more macro-level topics within the set of textual information; and extracting, at the processor, information indicative of one or more instances of the one or more macro-level topics within the set of textual information for each entity of the plurality of entities.

16. The method of claim 14, further comprising:

identifying, at the processor, one or more instances of an n-gram indicative of the one or more micro-level topics within the set of textual information; and extracting, at the processor, information indicative of one or more instances of the one or more micro-level topics within the set of textual information for each entity of the plurality of entities.

17. The method of claim 12, further comprising:

receiving, at the processor, information including a user-defined tag;

associating, at the processor, one or more entities of the plurality of entities represented within the database with the user-defined tag; and storing, at the database in communication with the processor, a list including information indicative of each entity of the one or more entities associated with the user-defined tag.

18. The method of claim 12, further comprising:

retrieving, at the processor, one or more web addresses associated with an entity of the one or more entities that are associated with the set of topic parameters based on the one or more edge lists;

retrieving, at the processor, webpage text data from one or more webpages associated with an entity of the one or more entities that are associated with the set of topic parameters based on the one or more edge lists; and retrieving, at the processor, a set of contact information from a set of textual information associated with an entity of the one or more entities that are associated with the set of topic parameters based on the one or more edge lists.

19. The method of claim 12, further comprising:

receiving, at the processor, a document including text indicative of the set of topic parameters including the one or more macro-level topic parameters or the one or more micro-level topic parameters; and applying, at the processor, a natural language processing methodology to the document yielding the information indicative of the set of topic parameters including the one or more macro-level topic parameters or the one or more micro-level topic parameters present within the document.

20. The method of claim 12, further comprising:

generating, at the processor, a data file including information indicative of the one or more entities that are associated with the set of topic parameters.

* * * * *